May 16, 1967 R. L. ALLEN ET AL 3,320,546
VARIABLE FREQUENCY CONTROLLED FREQUENCY DIVIDER
Filed Aug. 19, 1965
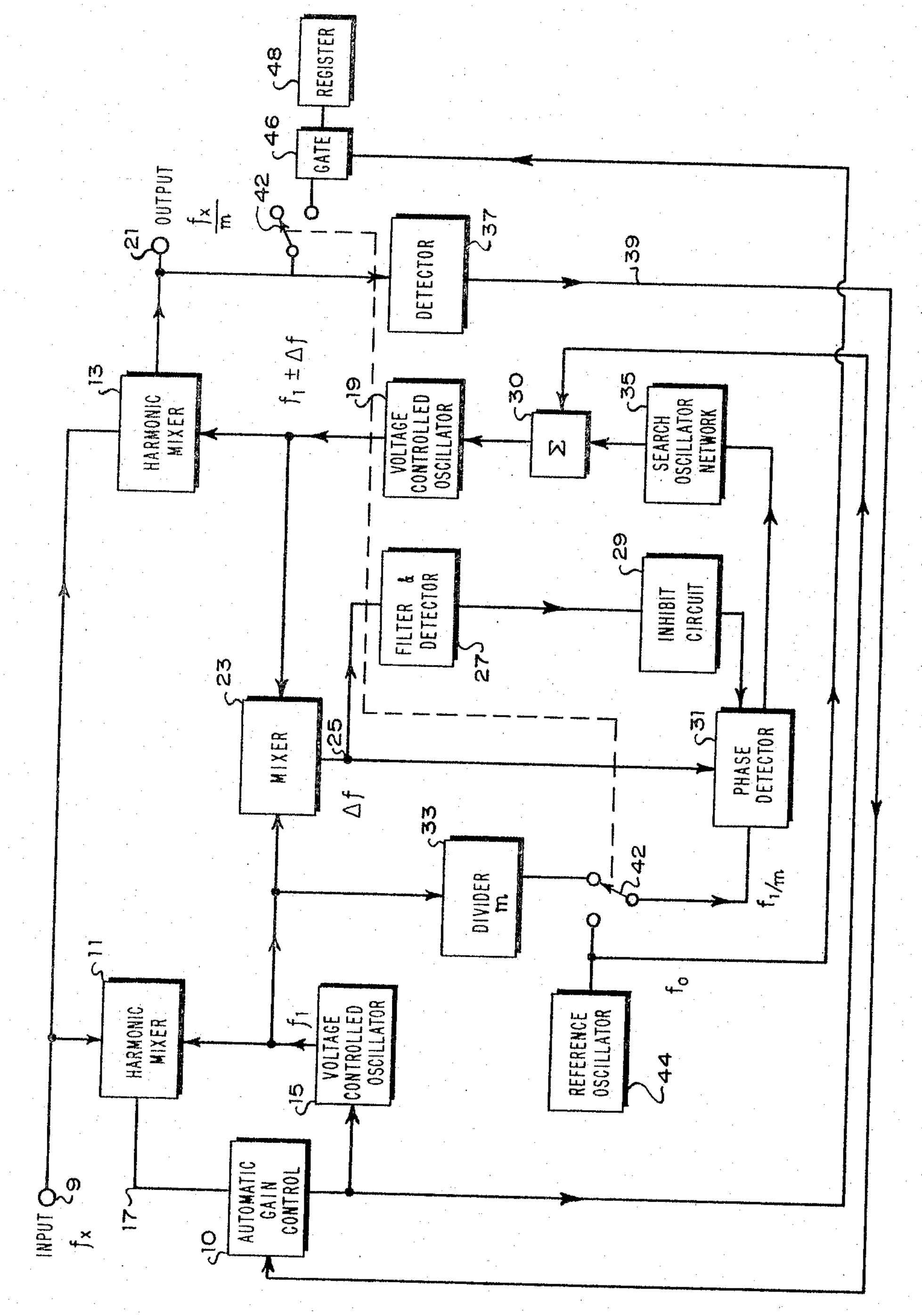
INVENTORS
ROBERT L. ALLEN
ALAN S. BAGLEY
BY A. C. Smith
ATTORNEY United States Patent Office 3,320,546
Patented May 16, 1967

3,320,546
VARIABLE FREQUENCY CONTROLLED FREQUENCY DIVIDER

Robert L. Allen and Alan S. Bagley, Los Altos Hills, Calif., assignors to Hewlett-Packard Company, Palo Alto, Calif., a corporation of California
Filed Aug. 19, 1965, Ser. No. 481,001
8 Claims. (Cl. 331—22)

This invention relates to a circuit for accurately dividing down a high frequency signal to a signal frequency within the operating range of conventional electronic counters. This eliminates the need for complex and costly counter circuitry to count directly the frequency of applied signals having frequencies of the order of 12.4 kilomegacycles.

Certain known high frequency counting circuits provide a display of the number of the selected harmonic of a reference frequency against which the applied signal is compared and another display of the frequency difference between the applied signal frequency and the selected harmonic. The applied signal frequency is thus determined by combining the two displays adjusted by a suitable scale factor, say 1000. One circuit of this type is described in U.S. patent application, Serial No. 323,320 filed November 13, 1963, by D. L. Howard and G. Vargiu and issued on Dec. 20, 1966, as U.S. Patent 3,293,559. One disadvantage encountered in a circuit of this type is that the applied signal frequency is not divided down by a fixed integer to be made available at an output for application to a utilization circuit.

Accordingly, it is an object of the present invention to provide a frequency dividing circuit which produces an output signal having a frequency which is a submultiple of an applied high frequency signal.

It is another object of the present invention to provide an improved frequency divider which includes a protection circuit for preventing erroneous operation at an improper input signal division factor.

It is still another object of the present invention to provide a frequency divider which operates automatically over a wide range of input frequencies and input signal levels.

In accordance with the illustrated embodiment of the present invention a pair of sampler-type harmonic mixers receive the applied high frequency signal for comparison with the outputs of a pair of voltage-controlled oscillators operating about center frequencies which are separated in frequency by an amount which is a selected percentage of one of the center frequencies. One of the oscillators is controlled by the output of one of the harmonic mixers to maintain phase lock with the applied high frequency signal. The other oscillator is controlled by a voltage proportional to the phase relationship between the signal from such one oscillator divided down by the selected frequency division factor and a signal derived from the two oscillators as the difference between their operating frequencies. The output of the remaining harmonic mixer is the difference frequency between the applied signal frequency and a harmonic of the frequency of the other oscillator. Since such other oscillator is phase locked to the first oscillator which is phase locked on a selected harmonic to the applied signal frequency, the output is an exact submultiple of the applied signal frequency.

Other and incidental objects of the present invention will be apparent from a reading of this specification and an inspection of the accompanying drawing which shows a block diagram of the present frequency divider.

In the drawing, an applied high frequency signal of unknown frequency $f_x$ appearing at terminal 9 is applied to the inputs of a pair of sampler-type harmonic mixers

11 and 13. These harmonic mixers may be conventional 4-diode bridge type samplers such as the normally nonconductive gates shown and described in U.S. Patent 3,011,129 issued on November 28, 1961, to K. B. Magleby et al. or may be samplers of the type shown and described in U.S. Patents 3,191,072 and 3,191,065 issued on June 22, 1965, respectively, to K. B. Magleby et al. and G. Vargiu. The sampler-type mixers 11 and 13 produce outputs which are related to the instantaneous amplitude and phase of the applied signal at the sampling instant. Mixer 11 receives the output of voltage-controlled oscillator 15 operating at a frequency $f_1$ (say, 30 megacycles) and produces a voltage with an average D.-C. value on output 17 which is related to the amplitude of the unknown frequency signal and to the instantaneous phase relationship between the applied signal at input terminal 9 and a harmonic of the oscillator signal $f_1$. This voltage is applied to the oscillator 15 through automatic gain control 10 for controlling its frequency to maintain phase lock between the applied signal and a harmonic of the oscillator frequency $f_1$. The harmonic mixer 13 also receives the applied signal and the signal from voltage controlled oscillator 19 which operates at a frequency $f_1 \pm \Delta f$ (say, 30 megacycles±30 kilocycles, i.e., $\Delta f$ equals $f_1$ divided by the selected input frequency divisor $m$) to produce a beat frequency at the output 21 which is a precise submultiple of the input signal.

In proper operation, mixer 23 receives the signals from oscillators 15 and 19 and produces the difference frequency $\Delta f$ (say, 30 kilocycles) at the output 25. The filter and detector 27 responds to frequencies within a narrow range about $\Delta f$ to actuate the inhibit circuit 29 which, in turn, renders the phase detector 31 operable. The mixer output 25 is applied to one input of phase detector 31 and the signal frequency $f$, divided down in divider 33 by the selected input frequency divisor (say 1000) is applied to the other input. The output of phase detector 31 is thus a voltage related to the phase relationship between the signals $\Delta f$ and $f_{1/m}$ applied to the phase detector 31. This voltage is applied through the search oscillator network 35 and summing network 30 to the oscillator 19 for controlling its frequency to maintain phase lock between oscillators 15 and 19 at a separation frequency of $\Delta f$. Thus since oscillator 19 is phase locked to oscillator 15 which, in turn, is phase locked to a submultiple of the frequency of the applied signal frequency at input terminal 9, then the frequency relationships at the mixers 11 and 13 and at phase detector 31 are, respectively:

$$nf_1 = \text{input frequency } (f_x) \quad (1)$$

$$nf_1 - n(f_1 \pm \Delta f) = n\Delta f = \text{output frequency} \quad (2)$$

$$\Delta f = f_{1/m} \quad (3)$$

where $n$ is the harmonic number and $m$ is the selected input frequency divisor. The output frequency at terminal 21 is thus:

$$n(\Delta f) = n(f_{1/m}) \quad (4)$$

From Equation 1:

$$f_{1/m} = f_{x/m} = \text{output frequency} \quad (5)$$

Thus, the applied signal frequency is accurately divided down in the present invention by a selected factor $m$ and appears as the output frequency which is a submultiple of the applied signal frequency over a wide range of values.

The filter and detector 27 and inhibit circuit 29 operate to prevent development at terminal 21 of an incorrect output signal by preventing phase lock of the two oscillators 15 and 19. The filter and detector 27 includes a narrow band pass filter centered about $\Delta f$ and applies an actuating signal to inhibit circuit 29 only when the output of mixer 23 is within the pass band of this filter.

When the output of mixer 23 is within the pass band of the filter, the circuit operates properly as a frequency divider, as previously described. When the output of mixer 23 is outside the filter pass band due, for example, to too wide a separation between the frequencies of oscillators 15 and 19, the inhibit circuit 29 disables the phase detector 31 so that no voltage suitable for controlling the oscillator 19 is produced at the output of phase detector 31. Search oscillator network 35 includes a low frequency oscillator which is inoperative during normal operation due to the voltage present at the output of phase detector 31 but which oscillates in the absence of such output. Thus, with no output from phase detector 31, the frequency of oscillator 19 is varied at a low frequency rate by the search oscillator network 35. This causes the output of mixer 23 to attain or tend to pass through the frequency value $\Delta f$, thereby opening gate 29 and establishing phase locked operation, as previously described.

Variations in the level of the applied signal frequency are compensated for by detector 37 which produces a control voltage on line 39 that is proportional to the level of the signal on terminal 21. A drop in the level of this signal indicates a low level signal frequency applied to terminal 9. The control voltage on line 39 alters the gain through automatic gain control 10 so that the gain around the phase lock loop including stages 10, 11 and 15 increases, thereby to insure continued phase locked operation on low level applied signal frequencies.

The frequency-controlling voltage applied to oscillator 15 of increased amplitude due to the increase in gain through stage 10 is also applied to oscillator 19 through summing network 30 to insure continued phase locked operation of the oscillators 15 and 19, as previously described.

The present invention may also indicate the number of the harmonic of a reference signal to which the input frequency is locked. This may be accomplished by setting switch 42 to the alternate position from the one shown to apply the signal $f_0$ from reference oscillator 44 to an input of detector 31 in place of the divided down signal $f_1$, as previously described. This has the effect of establishing phase lock between oscillators 15 and 19 at frequencies which are separated by the reference frequency $f_0$, i.e., $\Delta f$ assumes the value $f_0$. Thus from Equation 2, page 4 the output frequency becomes $nf_0$. This output is applied through ganged switch 42 and gate 46 to a register 48 such as a plurality of cascaded decade counting units where it is counted for a gate conduction period which is controlled by the reference oscillator 44. Register 48 thus displays the harmonic number $\eta$ of the frequency relationship between the input frequency $f_x$ and the frequency $f_1$ of oscillator 15. The number of the harmonic of oscillator frequency $f_1$ to which the input frequency $f_x$ locks thus varies as oscillator 15 is adjusted to reestablish phase lock on a new harmonic.

Therefore, the frequency divider of the present invention produces an output frequency which is an accurate selected submultiple of the unknown applied signal frequency over a wide range of applied signal amplitudes and frequencies.

We claim:

1. Signal divider apparatus comprising:
a pair of mixers each having an output and a pair of inputs;
an input terminal for receiving an applied signal;
means connected to said input terminal and to one input of each of said mixers for applying thereto a signal having a frequency related to the frequency of a signal appearing at said input terminal;
a signal-controlled source of repetitive time-varying signal connected to another input of one of said mixers;
means connecting the output of said one mixer to said source for applying a signal thereto to control the repetition rate of variation with time of the signal from said source to maintain phase lock between the signal at said one input of said one mixer and an integer related frequency component of the signal from said source applied to said one mixer;
circuit means having a pair of inputs and an output connected to another input of the other mixer for applying a signal thereto having a frequency which is offset from the frequency of signal appearing at one of the inputs of the circuit means by a selected frequency value which is related to the frequency of signal appearing at the other of the inputs of the circuit means;
means connecting said source to one input of said circuit means; and
means connected to said source and to the other input of said circuit means for applying thereto an integer related frequency component of the signal from said source.

2. Signal divider apparatus comprising:
a pair of harmonic mixers each having an output and a pair of inputs;
an input terminal for receiving a signal the frequency of which is to be divided;
means connected to said input terminal and to one input of each of said harmonic mixers for applying thereto the signal appearing at said input terminal;
a signal-controlled source of alternating signal connected to another input of one of said harmonic mixers;
means connecting the output of said one harmonic mixer to said source for applying a signal thereto to control the frequency of the alternating signal from said source to maintain phase lock between the signal appearing at said input terminal and an integer related frequency component of the signal from said source applied to said one harmonic mixer;
circuit means having a pair of inputs and an output connected to another input of the other harmonic mixer for applying a signal thereto having a frequency which is offset from the frequency of signal appearing at one of the inputs of the circuit means by a selected frequency value which is related to the frequency of signal appearing at the other of the inputs of the circuit means;
means connecting said source to one input of said circuit means;
a frequency divider; and
means including said frequency divider connecting said source to the other input of said circuit means for applying thereto an integer related subharmonic frequency component of the signal from said source, said other mixer producing an output frequency as the difference between the frequency of the signal appearing at said input terminal and the frequency of a harmonic of the signal at the output of said circuit means.

3. Signal divider apparatus comprising:
a pair of harmonic mixers each having an output and a pair of inputs;
an input terminal for receiving a signal the frequency of which is to be divided;
means connected to said input terminal and to one input of each of said harmonic mixers for applying thereto the signal appearing at said input terminal;
a signal-controlled source of alternating signal connected to another input of one of said harmonic mixers;
means connecting the output of said one harmonic mixer to said source for applying a signal thereto to control the frequency of the alternating signal from said source to maintain phase lock between the signal appearing at said input terminal and a harmonic frequency component of the signal from said source applied to said one harmonic mixer;

another signal-controlled source of alternating signal;
a mixer having an output and a pair of inputs, each connected to one of said sources;
a frequency divider connected to said one source for producing at an output thereof a signal frequency equal to a submultiple of the frequency of signal from said one source;
means connected to said other source for applying thereto a control signal related to the phase relationship between the signal at the output of said mixer and the signal frequency at the output of said divider to alter the frequency of said other source for maintaining phase lock between said sources; and
means connecting said other source to the remaining input of the other harmonic mixer for producing at the output thereof an output frequency as the difference between the frequency of signal appearing at said input terminal and the frequency of a harmonic of the signal from said other source.

4. Signal divider apparatus comprising:
a pair of harmonic mixers each having an output and a pair of inputs;
an input terminal for receiving a signal the frequency of which is to be divided;
means connected to said input terminal and to one input of each of said harmonic mixers for applying thereto the signal appearing at said input terminal;
a signal-controlled source of alternating signal connected to another input of one of said harmonic mixers;
means connecting the output of said one harmonic mixer to said source for applying a signal thereto to control the frequency of the alternating signal from said source to maintain phase lock between the signal appearing at said input terminal and a harmonic frequency component of the signal from said source applied to said one harmonic mixer;
another signal-controlled source of alternating signal connected to the other input of said other harmonic mixer;
a mixer having an output and a pair of inputs, each connected to one of said sources;
a frequency converter for producing at an output thereof a signal frequency equal to an integer related frequency component of a signal applied to said converter;
detector means having one input connected to the output of said frequency converter and having another input and an output which is connected to said other source for applying thereto a control signal related to the phase relationship between the signals appearing at said one and said other inputs of said detector means to alter the frequency of said other source;
means connecting the output of one of said mixer and said one source to the input of said frequency converter; and
means connecting the output of the other of said mixer and said one source to said other input of the detector means for maintaining phase lock between said sources;
said other harmonic mixer producing at the output thereof an output frequency as the difference between the frequency of signal appearing at said input terminal and the frequency of a harmonic of the signal from said other source.

5. Signal divider apparatus comprising:
a pair of harmonic mixers each having an output and a pair of inputs;
an input terminal for receiving a signal the frequency of which is to be divided;
means connected to said input terminal and to one input of each of said harmonic mixers for applying thereto the signal appearing at said input terminal;
a signal-controlled source of alternating signal;
means connecting said source to another input of one of said harmonic mixers;
means connecting the output of said one harmonic mixer to said source for applying a signal thereto to control the frequency of the alternating signal from said source to maintain phase lock between the signal appearing at said input terminal and a harmonic frequency component of the signal from said source applied to said one harmonic mixer;
another signal-controlled source of alternating signal;
a mixer having an output and a pair of inputs, each connected to one of said sources;
a frequency divider connected to said one source for producing at an output thereof a signal frequency equal to a submultiple of the frequency of signal from said one source;
detector means having a pair of inputs and an output for producing a control signal at said output proportional to the phase relationship between the signals appearing at the inputs thereof;
means connecting an input of said detector means to the output of said mixer;
means connecting the other input of said detector means to the output of said divider;
frequency-responsive circuit means connected to the output of said mixer for maintaining said detector means inoperative and for rendering said detector means operative to produce a control signal at its output in response to the output of said mixer attaining a selected frequency;
circuit means connecting said output of the detector means to said other signal-controlled source of alternating signal for maintaining phase lock between said sources;
means connecting said other source to the remaining input of the other harmonic mixer for producing at the output thereof an output frequency as the difference between the frequency of signal appearing at said input terminal and the frequency of a harmonic of the signal from said other source.

6. Apparatus as in claim 5 comprising:
a detector connected to the output of said other harmonic mixer for producing a control signal related to the amplitude of the signal at the last-named output;
said means connecting the output of said one harmonic mixer to said source includes a gain control circuit connected to receive said control signal from said detector for altering the gain in the circuit loop including said one harmonic mixer, said gain control circuit and said source; and
said circuit means includes a summing network connected to said other source for applying thereto the combination of the signals at the outputs of said gain control circuit and detector means.

7. Signal divider apparatus comprising:
a mixer having a pair of inputs and an output;
circuit means having an input and an output for producing a signal at the output thereof having a frequency related to a selected submultiple of the frequency of a signal applied to the input thereof;
an input terminal for receiving an applied signal;
means connecting the input terminal to an input of the mixer and to the input of said circuit means for applying thereto a signal having a frequency related to the frequency of a signal appearing at the input terminal;
a source of reference oscillations;
mixer means having an input connected to receive the output of said circuit means and another input connected to receive the reference oscillations from said source and having an output connected to the other input of said mixer for applying a signal thereto having a frequency which is offset from said submultiple frequency by a selected frequency value; and means connected to the output of the mixer and to said source for combining the signals received therefrom to produce an output signal indicative of the submultiple relationship between the frequency of signal at the output of said circuit means and the frequency of signal at said input terminal.

8. Signal divider apparatus as in claim 7 wherein:

said circuit means comprises another mixer having one input connected to receive signal at said input terminal and having another input and an output;

a signal-controlled source of alternating signal having a control-signal input and having an output connected to the other input of said other mixer;

means connecting the output of said other mixer to the signal-control input of said source to control the frequency of the alternating signal at the output thereof to maintain phase lock between the signal at said one input of said other mixer and the frequency of the alternating signal applied to the other input of said other mixer for providing a signal at the output of said signal-controlled source which is indicative of the submultiple relationship between the alternating signal from said signal-controlled source and the frequency of signal at said input terminal.

No references cited.

ROY LAKE, *Primary Examiner.*

S. H. GRIMM, *Assistant Examiner.*